(12) United States Patent
Ebert et al.

(10) Patent No.: US 9,868,399 B1
(45) Date of Patent: Jan. 16, 2018

(54) REMOTE CONTROL ELECTRIC MIRRORS (71) Applicants: William A. Ebert, Tucson, AZ (US); Adam John Sullivan, Tucson, AZ (US)

(72) Inventors: William A. Ebert, Tucson, AZ (US); Adam John Sullivan, Tucson, AZ (US)

(73) Assignee: William A. Ebert, Tucson, AZ (US)

( * ) Notice: Subject to any disclaimer, the term of this patent is extended or adjusted under 35 U.S.C. 154(b) by 0 days.

(21) Appl. No.: 15/677,905

(22) Filed: Aug. 15, 2017

Related U.S. Application Data (60) Provisional application No. 62/496,313, filed on Oct. 11, 2016.

(51) Int. Cl.
G02B 7/182 (2006.01)
B60R 1/072 (2006.01)
B60R 1/06 (2006.01)

(52) U.S. Cl.
CPC ............ *B60R 1/072* (2013.01); *B60R 1/0607* (2013.01); *G02B 7/182* (2013.01)

(58) Field of Classification Search
CPC B60R 1/064; B60R 1/072; B60R 1/02; B60R 1/062; B60R 1/087; B60R 1/0612; B60R 1/0605; B60R 1/061; B60R 1/0625; B60R 1/066; B60R 1/067; G02B 7/183; G02B 7/198; G02B 7/1827

USPC ......................................................... 359/877
See application file for complete search history.

(56) References Cited

U.S. PATENT DOCUMENTS

| 3,277,678 | A |   | 10/1966 | Booth |
| 4,190,326 | A |   | 2/1980 | Brodbeck |
| 5,268,796 | A | * | 12/1993 | Tomerlin ............. B60R 1/0612 248/486 |
| 5,621,577 | A |   | 4/1997 | Lang et al. |
| 9,187,040 | B2 |   | 11/2015 | Ebert |

* cited by examiner

Primary Examiner — Euncha Cherry
(74) Attorney, Agent, or Firm — R. Michael West

(57) ABSTRACT

Remote controlled electric mirrors include a main frame, housing horizontal and vertical electrical ram actuators. The body portion of each actuator is pivotally mounted to the main frame. The main frame includes clamp brackets on its lower side, for mounting to support arms extending from a motor vehicle. An elongated swivel member is pivotally mounted to the front of the main frame, for rotation about a horizontal axis. A movable portion of the vertical actuator is pivotally connected to the swivel member. The swivel member includes an upper pin and a lower pin. An upper bracket on the rear of the mirror frame includes an aperture, slip-fitted over the upper pin. An apertured clamp is slip-fitted over the lower pin, and bolted to a lower bracket on the mirror frame. The movable portion of the horizontal actuator is pivotally connected through a heim joint to rear of the mirror frame.

20 Claims, 7 Drawing Sheets

REMOTE CONTROL ELECTRIC MIRRORS

PRIORITY CLAIM

Pursuant to the provisions of 35 U.S.C. Section 119(e), Applicants claim the priority of their U.S. Provisional Patent Application No. 62/496,313, filed Oct. 11, 2016.

BACKGROUND OF THE INVENTION

1. Field of the Invention

The invention relates generally to rear view mirrors mounted on heavy duty motorized vehicles. More specifically, the invention pertains to exterior side-mounted rear view mirrors which are remotely controllable by the driver of the motorized vehicle, and which incorporate structural features particularly well suited for quick installation, maintenance, and reconfiguration of the mirrors.

2. Description of the Prior Art

U.S. Pat. No. 3,277,678, issued to Booth, shows a Remotely Adjustable Truck Mirror supported by upper and lower studs which register within bolting holes at the extremities of supporting arms. A cable and worm gear arrangement provides the remote drive feature for the mirror.

In U.S. Pat. No. 4,190,326, granted to Brodbeck, a Motor Controlled Mirror Positioning Apparatus is taught. A mirror is disposed within a protective housing that itself is mounted to provide rotational and tilting adjustments about vertical and horizontal axes. Reversible rotation and tilting motors, controlled by remote switches, effect the mirror positional adjustments.

A Powered Vehicle Mirror is shown in U.S. Pat. No. 5,268,796, granted to Tomerlin et al. This construction employs a mirror housing with a bi-directional motor and a speed reduction gear therein. The reduction gear is coupled to a pair of threaded shuttles which are either drawn together or spread apart to produce a rotational force against a shaft to pivot the mirror.

U.S. Pat. No. 5,621,577, issued to Lang et al., discloses an External Rear-View Mirror For Commercial Vehicles. This mirror assembly includes a housing for at least one adjustable mirror, and an electrical or manual positioning actuator connected thereto. A clamping arrangement is used in conjunction with a support arm and a support plate to minimize mirror vibrations.

In U.S. Pat. No. 9,187,040, granted to Ebert, an Adjustable Extremely Large Mirror For A Vehicle is shown. The mirror is placed in a holder with two or more pillow block bearings secured on the back of the holder. A first rod extends generally vertically to pass through the pillow block bearings. The center portion of the first rod passes through a connecting block. A second rod, having a horizontal orientation, also passes through the connecting block and is attached to the back of the holder. Remotely controlled rams are operably connected to the mirror holder to effect movement of the mirror about vertical and horizontal axes.

However, the need still exists for an improved arrangement for supporting a remotely controlled rear view mirror about horizontal and vertical axes in a manner which facilitates quick installation, maintenance, and reconfiguration of the mirror assembly.

The need also exists for a remotely controlled rear view mirror which has an improved housing for protecting electric ram actuators and an associated electronic control module, used to adjust the horizontal and vertical orientation of the mirror;

The need further exists for both a wireless and a hard-wired remotely controlled rear view mirror which can be adapted for both left driver side and right passenger side applications; and, The need further exists for remotely controlled rear view mirrors for both driver side and passenger side applications which are identical in construction, and mountable on conventional and existing mirror support arms.

These and other objects and features of the invention herein will become apparent from the drawings and the written specification which follow.

SUMMARY OF THE INVENTION

The invention comprises left side and right side electric mirror assemblies, adapted for mounting on the exterior of motorized vehicles, particularly large industrial trucks. Each assembly includes a main frame, housing first and second electrically powered ram actuators, one for effecting horizontal sweep adjustment of the mirror, and the other for effecting vertical tilt adjustment of the mirror. The rear body end of each ram is pivotally mounted to the main frame. An electronic control module is also mounted to the main frame. The control module includes an rf receiver, in a wireless embodiment of the invention, and electronic drivers for powering the ram actuators. Side walls and a removable top cover are also provided on the main frame to protect the ram actuators and the control module from damage caused by falling debris, such as rocks. The main frame also includes clamp brackets on its lower side, for mounting to the standard mirror support arms extending from the cab of the truck or other motor vehicle to which the mirrors are mounted.

An elongated, generally vertical, swivel member has an upper end and a lower end. The swivel member also has an intermediate portion which is pivotally mounted to the front of the main frame, for rotation about a horizontal axis. The forward movable portion of the vertical ram actuator is pivotally connected to a flange on the swivel member, vertically offset from the location of the horizontal axis.

The swivel member includes an upper pin extending from its upper end, and a lower pin extending from its lower end. An upper bracket on the rear side of a mirror frame includes an aperture which receives the upper pin of the swivel member, during mirror assembly. A clamp having an aperture is slip fitted over the lower pin of the swivel member, and is then bolted to a lower bracket on the rear side of the mirror frame. The forward movable portion of the horizontal ram actuator is pivotally connected by means of a heim joint, to a flange mounted on the rear side of the mirror frame.

The foregoing describes the three step assembly process, in attaching the mirror frame to the main frame and its associated components. If it is desired to remove the mirror and the mirror frame from the main frame and the swivel member, this assembly process is simply reversed. In this manner, a different type of mirror, a replacement mirror, or a replacement mirror frame and mirror may be installed. The mirror frame may also include a slide mounting feature, so a replacement mirror may be installed without removing the mirror frame from the main frame.

Reversing the assembly process and removing the mirror frame and mirror will also facilitate removal the top cover from the main frame, so that actuator rams and the electronic control module may be serviced. Because only three connection assemblies are involved in the disassembly process, a mechanic can typically make part replacement type repairs in a matter of minutes.

When the vertical actuator ram is extended or retracted, the mirror will rotate about the horizontal axis of the horizontal shaft, tipping the mirror upwardly or downwardly as needed to provide the desired rear view. When the horizontal actuator ram is extended or retracted, the mirror will rotate about the generally vertical axis of the swivel member, directing the field of view of the mirror inwardly or outwardly from the body of the vehicle.

The reversible vertical and horizontal ram actuators are remotely controlled by a toggle switch box, preferably including pair of rocker switches. The respective rocker or toggle switches may be manipulated by the driver to effect vertical and horizontal adjustment of the position of the mirror while the driver is in the cab or compartment of the motor vehicle. The toggle switch box may include an rf transmitter, for wireless communication with the rf receiver in the electronic control module. The toggle switch box may also be hard wired directly to the electronic control module for controlling the action of the ram actuators. In either case, power is provided to the ram actuators and the control module through a supply line preferably connected to the vehicle's electrical system.

Both right and left remotely controlled mirrors may be installed on the motor vehicle, using substantially identical mirror assemblies. An optional left/right selector switch may be provided either in a separate housing or in the toggle switch box, to determine which mirror is to be controlled by the rocker or toggle switches at any particular time.

The right electric mirror may include a conventional flat mirror, for those applications where a true and undistorted image of the right side rear view is desirable. Alternatively, a convex mirror element may be provided in the right electric mirror frame, where a large field of view for the right side mirror is desired.

The reconfiguration of either the right or the left electric mirror, to change from a flat mirror element to a convex mirror element, or vice versa, is accomplished by simply removing the existing mirror frame from the main frame and the swivel assembly, and replacing it with a new mirror frame with a new mirror element of the desired type and field of view. No other disassembly or reassembly of the mirror assembly is required for a mirror element reconfiguration.

BRIEF DESCRIPTION OF THE DRAWINGS

FIG. 10 is a right front perspective of the mirror assembly of FIG. 8 fitted with a convex mirror element;

FIG. 11 is a left rear exploded perspective of the mirror assembly of FIG. 10; and, FIG. 12 is a perspective view taken to an enlarged scale, of a toggle switch box having left and right mirror controls in a single box.

DETAILED DESCRIPTION OF THE PREFERRED EMBODIMENT

Figure 1:
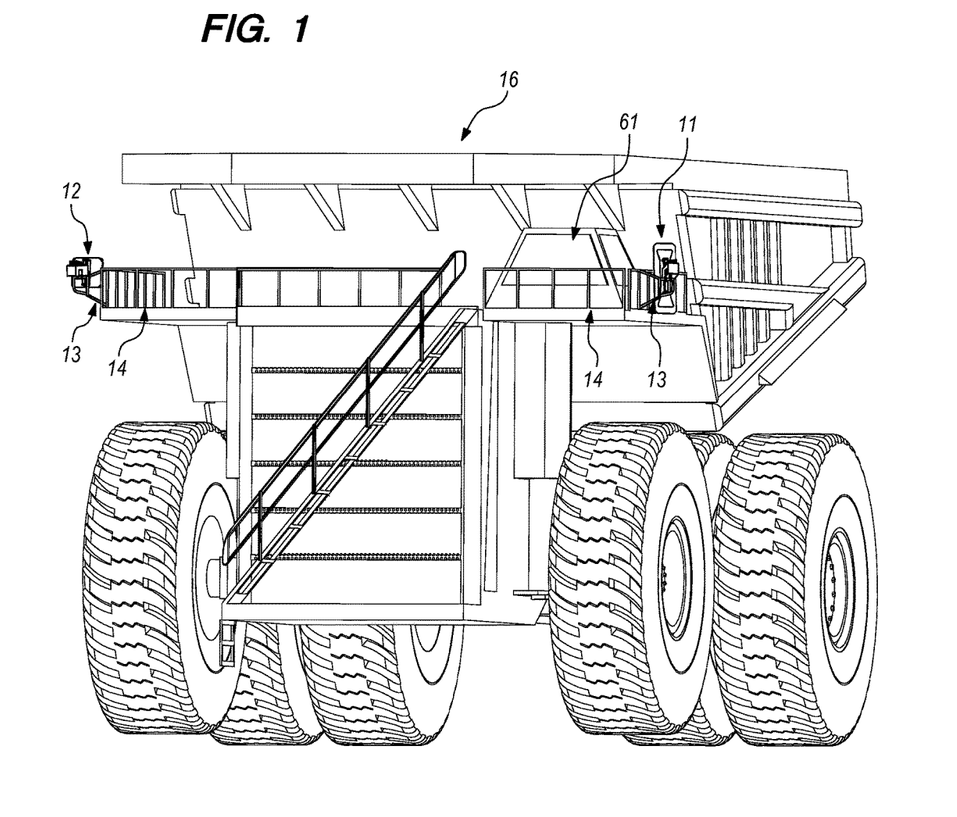
FIG. 1 is front perspective view of a heavy duty, industrial truck, fitted with left side and right side remotely controlled electric mirror assemblies.

Turning now to the drawings, FIG. 1 shows a left remote control mirror assembly 11 and a right remote control mirror assembly 12, mounted on respective mirror support arms 13. Because mirror assembly 11 and mirror assembly 12 are identical in construction, and interchangeable, most references hereinafter will be made to mirror assembly 11 with the understanding that these references apply also to mirror assembly 12. Mirror support arms 13 are commercially available, and conventional in construction. Support arms 13 may be configured as shown in the drawings, or they may comprise a single arm, mounted on the left and right hand sides of the forward end 14 of a heavy duty truck 16. As will be explained more fully below, mirror assembly 11 is particularly well suited for use with a heavy duty truck 16 employed in the mining or material hauling industries, but it is readily adapted for use with other types of motor vehicles, as well.

Figures 2, 3:
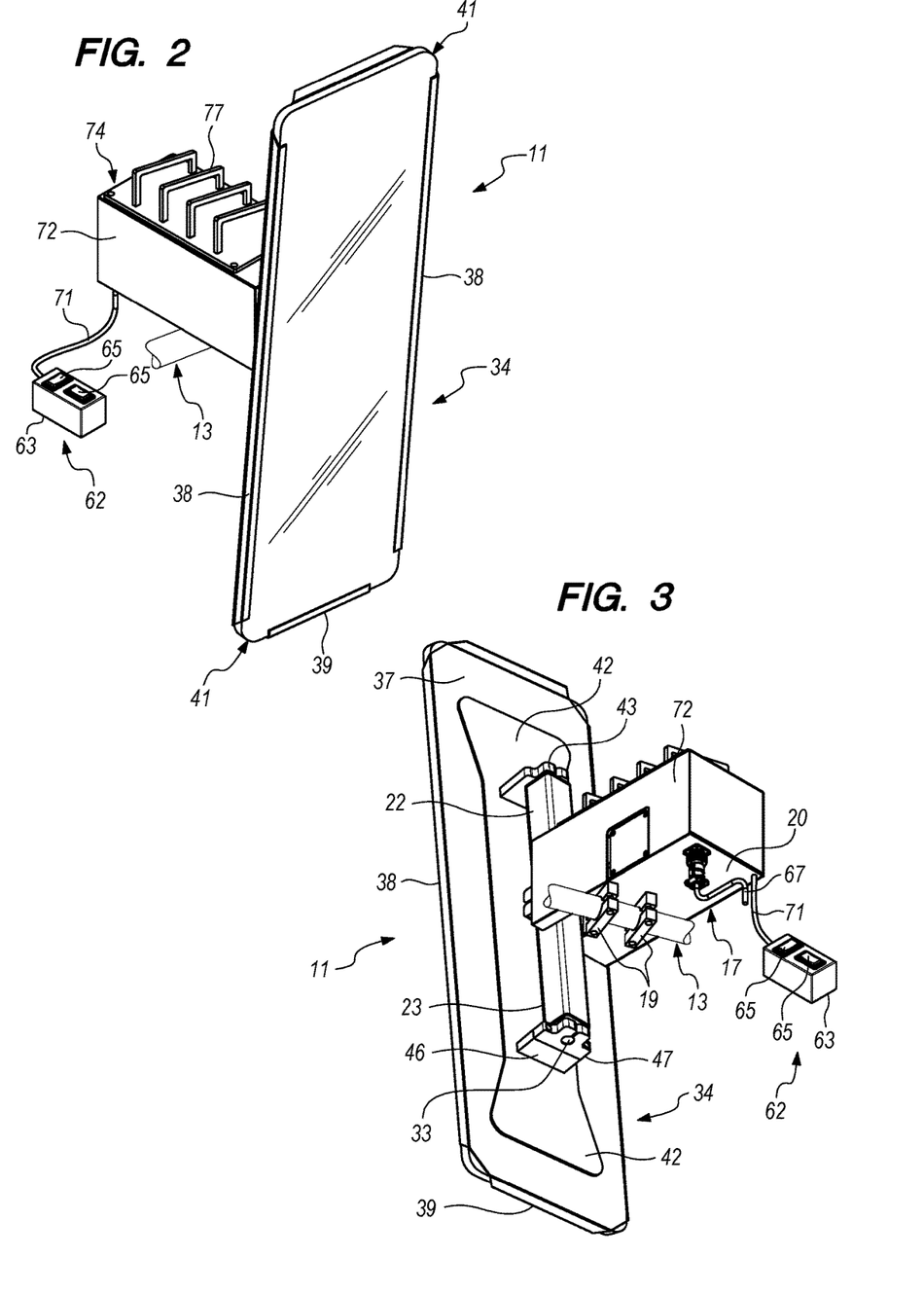
FIG. 2 is a right front perspective view of a mirror assembly hard wired to a toggle switch.
FIG. 3 is a perspective view taken from a low angle, of the bottom portion of the main frame, showing the connectors connected around a portion of a mirror support arm.

Mirror assembly 11 comprises a main frame 17, having a front end 18. (See, FIG. 4). A pair of connectors 19, preferably in the form of pipe clamps, is mounted to the underside 20 of main frame 17. A portion of mirror support arm 13 passes through connectors 19, which provide compressive and frictional forces to maintain main frame 17 securely in place. (See. FIG. 3).

Figure 4:
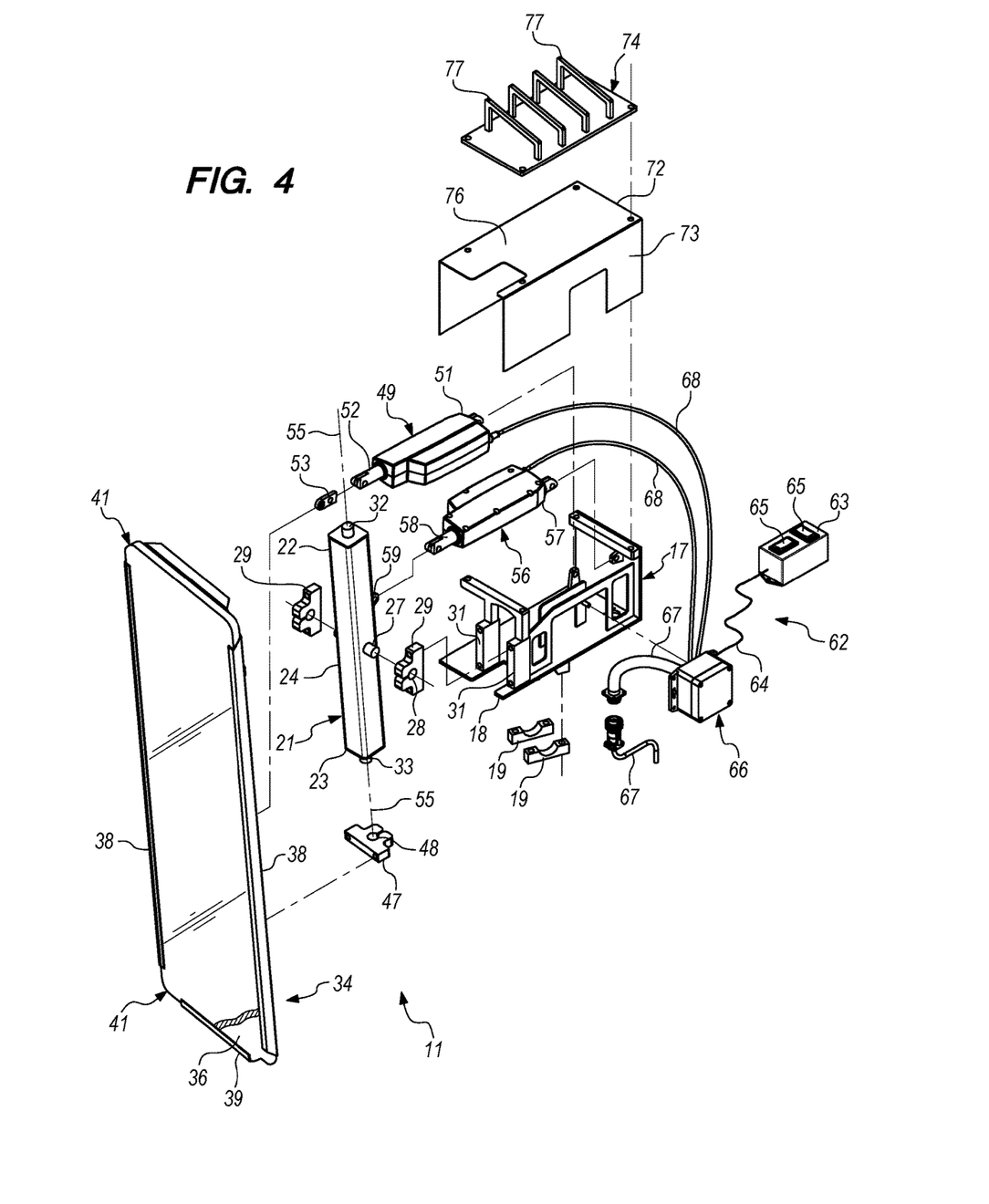
FIG. 4 is a left front exploded perspective view of a mirror assembly, showing the mirror frame and mirror, the swivel member and its pivotal brackets, the two ram actuators, the heim joint, the electronic control module, and the frame with its top cover and rock shield.

Associated with main frame 17 is a swivel member 21, having an upper end 22, a lower end 23, and an intermediate portion 24 therebetween. Intermediate portion 24 is pivotally mounted about a horizontal axis 26 to front end 18 of main frame 17. This is accomplished by means of pins 27, extending from either side of swivel member 21, passing through respective bores 28 in brackets 29. Brackets 29, in turn, are bolted to mounting blocks 31 on the front end 18 of main frame 17. Swivel member 21 further has an upper pin 32 extending from upper end 22, and a lower pin 33 extending from lower end 23.

Figure 5:
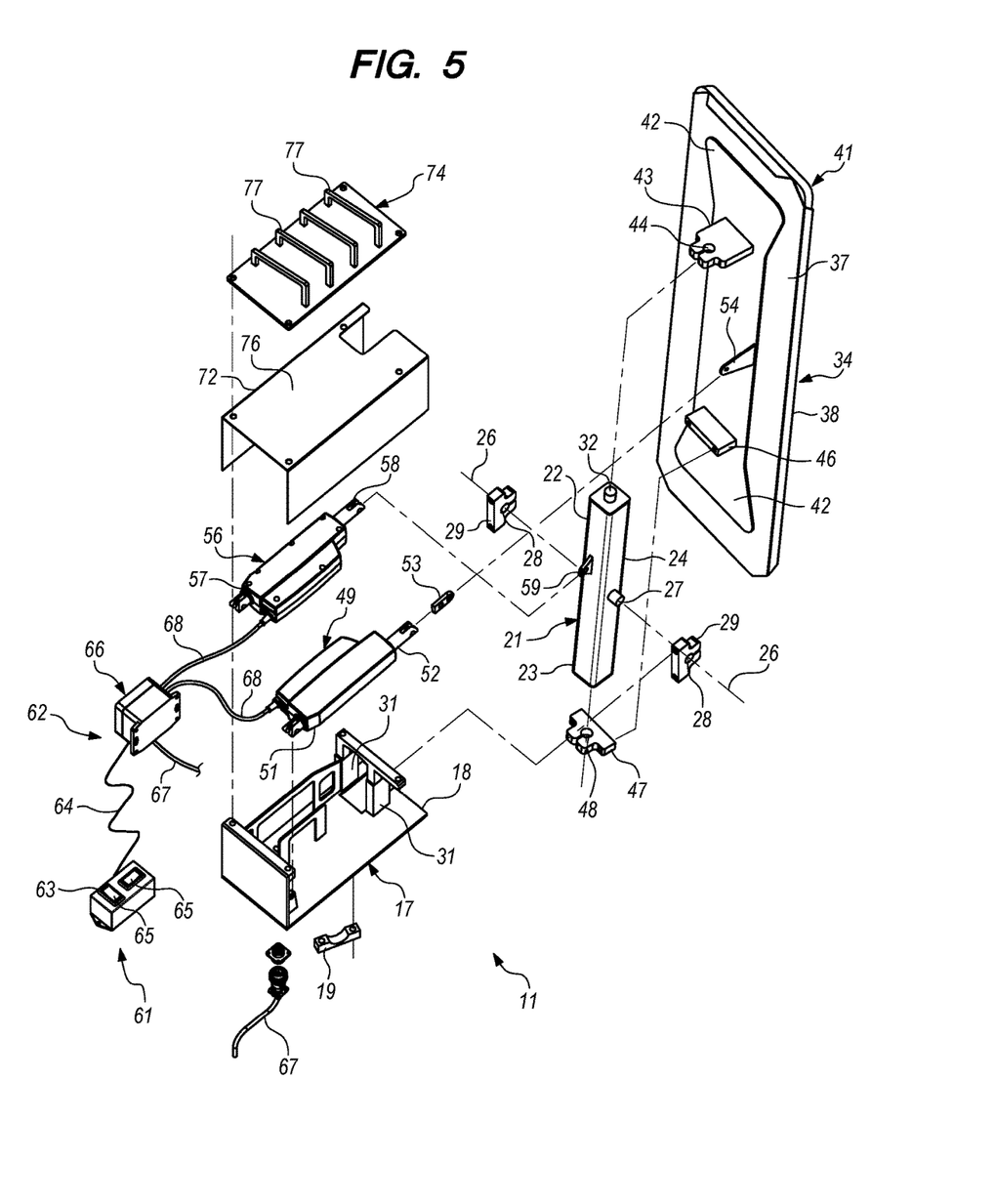
FIG. 5 is a left rear exploded perspective view of a mirror assembly, showing all of the components of FIG. 4 and the attachment features on the rear of the mirror frame.

Making specific reference to FIG. 4 and FIG. 5, mirror assembly 11 also includes a mirror frame 34. Mirror frame 34 has a front side 36 a rear side 37, side edge slots or grooves 38, and a bottom groove 39. A planar mirror 41 is positioned over front side 36, by sliding the mirror 41 downwardly, with its edges registered within side edge grooves 38. After the bottom edge of mirror 41 has entered bottom groove 39, the mirror 41 is fully installed. A lower corner of the mirror 41 has been broken away in FIG. 4 to show the front side 36 of mirror frame 34 more clearly. In this configuration of mirror frame 34, the replacement of a broken mirror is easily completed, by simply lifting the broken mirror out, and sliding a new mirror 41 in place.

It should also be noted that mirror assembly 11 may also be reconfigured to provide a wider field of view for the mirror assembly 11. This is undertaken by removing the existing mirror frame 34 from the main frame 17 and the swivel member 21, and replacing it with a substitute mirror frame 34 housing a convex style mirror element. This feature provides a very quick mirror reconfiguration process, and allows the same mirror assembly 11 to be used where a planar mirror is desired on the left hand side of the truck 16, and a convex mirror is desired on the right hand side.

The rear side 37 of the mirror frame 34 includes a reinforcement plate 42, extending substantially the vertical extent of rear side 37. (See, FIG. 5). Attached to reinforcement plate 42 is an upper bracket 43 provided with an aperture 44 to receive upper pin 32 of swivel member 21. A lower bracket 46 is mounted on the lower portion of reinforcement plate 42. A removable clamp 47 has an aperture 48 which receives lower pin 33 of swivel member 21. During attachment of the mirror frame 34 to the swivel member 21, upper pin 32 is inserted into aperture 44, lower pin 33 is inserted into aperture 48, and clamp 47 is bolted onto lower bracket 46. This assembly process is most clearly evident from examining FIG. 5. For disassembly, or removal of the mirror frame 34, this part of the process is simply reversed.

Figure 7A:
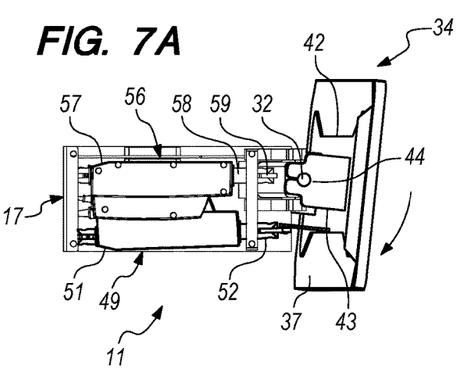
FIG. 7A is a top plan view of a mirror assembly, showing an inward view adjustment of the mirror effected by the horizontal ram actuator.
Figure 7B:
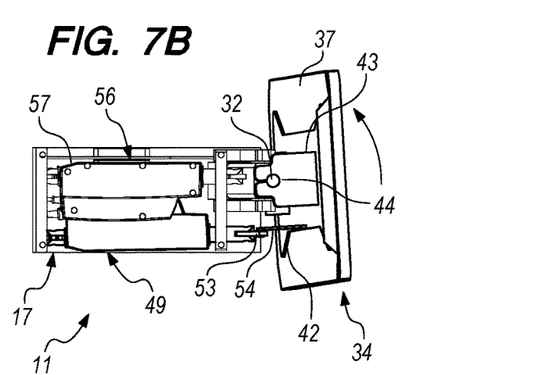
FIG. 7B is a view as in FIG. 7A, but showing an outward view adjustment.

A horizontal sweep ram actuator 49 has a rear body portion 51 pivotally connected to main frame 17. Ram actuator 49 also has a movable portion 52, extending past the front end 18 of main frame 17. The end of movable portion 52 is pivotally connected by means of a heim joint 53, to a flange 54 mounted on reinforcement plate 42 on the rear side 37 of mirror frame 34. The removal or attachment of the heim joint 53 is another of the steps to be undertaken, if the mirror frame 34 is to be removed from or attached to the swivel member 21. Owing to the offset position of flange 54 from a vertical axis 55 of swivel member 21, and the pivotal mounting of pins 32 and 33 respectively within apertures 44 and 48, extension and retraction motion of movable portion 52 causes an appropriate change in the horizontal view of mirror 41. (See, FIG. 7A and FIG. 7B).

Figures 6A, 6B:
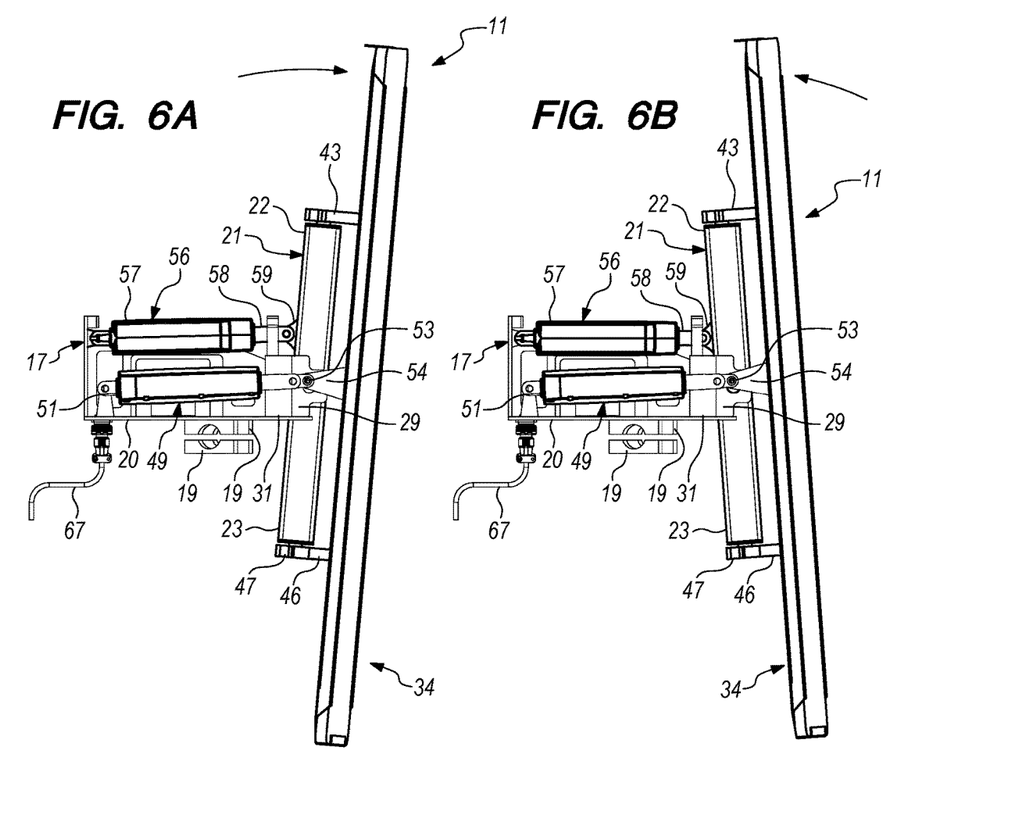
FIG. 6A is a side elevational view of a mirror assembly, showing a downward tilt adjustment of the mirror effected by the vertical ram actuator.
FIG. 6B is a view as in FIG. 6A, but showing an upward tilt adjustment.

Also provided is a vertical tilt ram actuator 56, having a body portion 57 pivotally connected to main frame 17. Ram actuator 56 also includes a movable portion 58, extending past the front end 18 of main frame 17. The end of movable portion 58 is pivotally connected to a flange 59 mounted on swivel member 21, in a position vertically offset from horizontal axis 26. The removal or attachment of the end of the movable portion 58 is yet another of the necessary steps, if the mirror frame 34 is to be removed from or attached to the swivel member 21. Because swivel member 21 is pivotally mounted about horizontal axis 26 by means of pins 27 passing through respective bores 28 in brackets 29, extension and retraction motion of movable portion 58 results in a corresponding change in the vertical view of mirror 41. (See, FIG. 6A and FIG. 6B).

Preferably, both horizontal sweep ram actuator 49 and vertical tilt ram actuator 56 are electrically powered, reversible, include gear mechanisms to facilitate precise adjustments in the position of the mirror 41. Alternatively, these actuators may be either pneumatic or hydraulic, although such actuators would required different control mechanisms and different sources of drive than expressly shown herein. It is also preferred that both ram actuators include an internal damping feature, to minimize vibrations transferred the mirror frame 34 on account of vibrations originating from the frame of the truck 16.

For the purpose of controlling the horizontal and vertical view of the mirror 41 from the inside of a cab 61 on the forward end 14 of truck 16, means 62 for selectively actuating horizontal sweep ram actuator 49 and vertical tilt ram actuator 56, is provided. In its most basic configuration, means 62 comprises a single toggle switch box 63 conveniently located in cab 61 within reach of the driver. For wireless operation, such as shown in FIG. 4 and FIG. 5, toggle switch box 63 includes an rf transmitter (not shown), and two control switches 65, one having a horizontal orientation and the other having a vertical orientation. When the driver actuates a selected one of the control switches 65, an rf signal 64 is transmitted to an electronic control module 66 mounted on main frame 17. In its wireless configuration, electronic control module 66 houses an rf receiver and ram actuator drivers (not shown).

Power to the control module 66 is provided by a power supply line 67, preferably interconnected to the main power circuit used by the truck 16. Independent, remote, or auxiliary sources of power may be used to power the mirror assembly 11 as well. The ram actuator drivers are interconnected to a respective horizontal or vertical ram actuator by output lines 68. The purpose of the ram actuator drivers is to respond to low current control signals from the rf receiver, and to provide electrical power to motors in the ram actuators, of the correct directional polarity and for the selected duration of actuation.

Figures 10, 11, 12:
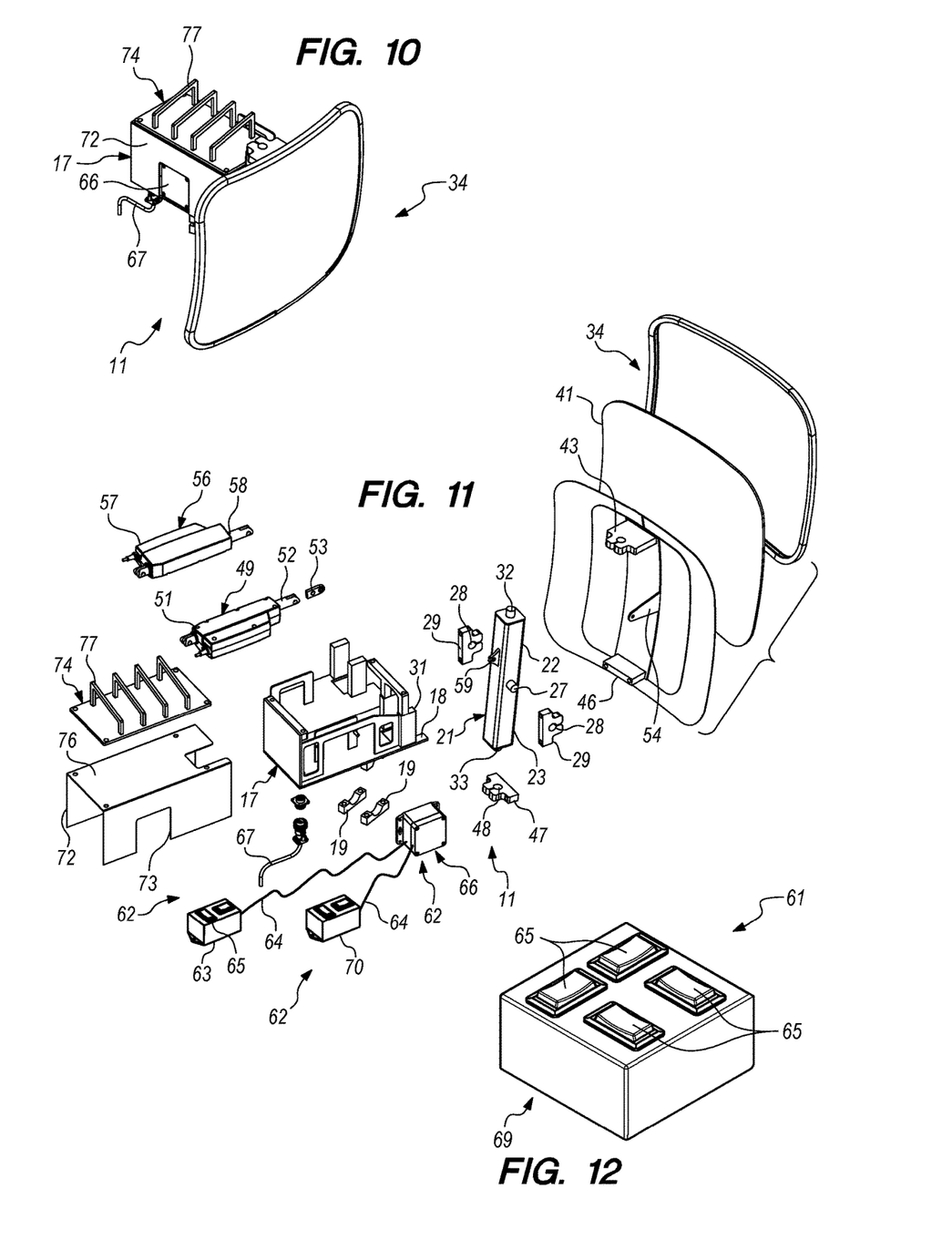

In FIG. 11, another configuration of means 62 for selectively actuating horizontal sweep ram actuator 49 and vertical tilt ram actuator 56 is disclosed. In this arrangement, the second right mirror assembly 12 is not shown, as it is identical to the left mirror assembly which is already shown in great detail. What is different in this configuration is a second toggle switch box 69, to control the operation of the second right mirror assembly 12. Similarly, in FIG. 12, an integrated toggle switch box 69 is shown, which includes two sets of horizontal and vertical control switches 65, the left set for controlling the movements of a left mirror assembly 11 and the right set for controlling the movements of a right mirror assembly 12.

In a hard wired version of means 62 for selectively actuating horizontal sweep ram actuator 49 and vertical tilt ram actuator 56, the electronic control module 66 has a hard wired input circuit 71 respectively interconnected to horizontal and vertical control switches 65 in the toggle switch box 63. (See, FIG. 2 and FIG. 3). A hard wired electronic control module 66 has output circuits respectively interconnected to the horizontal sweep ram actuator 49 and the vertical tilt ram actuator 56, although these components cannot be seen in FIG. 2 and FIG. 3. Nevertheless, the hard wired interconnection between the main frame 17 and the toggle switch box 63 is evident.

To provide protection from the elements for the electronic control module 66 and the ram actuators 49 and 56, frame 17 includes a detachable housing 72. Detachable housing 72 preferably includes a cutout 73, so that rf signals 64 will be received by electronic control module 66. Alternatively, a plastic window (not shown) may be employed in housing 72, to allow unimpeded transmission of rf signals 64. An option for frame 17 includes a rock shield 74 above and attached to an upper wall 76 of housing 72. Rock shield 74 includes a plurality of inclined deflection 77 ribs spaced along the upper surface of shield 74. These ribs are effective to intercept and deflect falling rocks and other debris before they can inflict damage on housing 72.

Figures 8, 9:
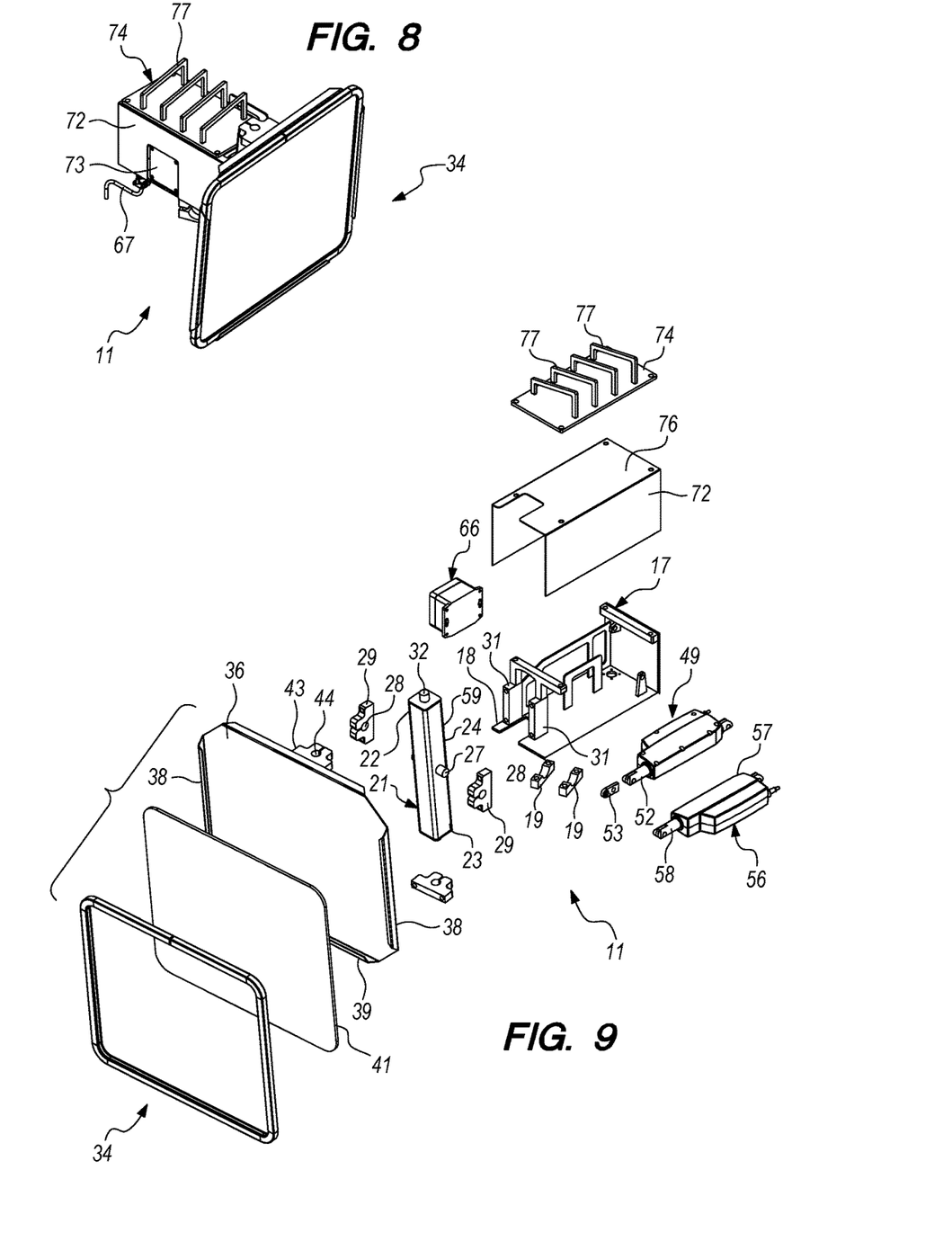
FIG. 8 is a right front perspective of a mirror assembly with a smaller planar mirror, providing a distortion free wider field of view.
FIG. 9 is a left front exploded perspective of the mirror assembly of FIG. 8.

While the mirror frame 34 in FIGS. 2 and 3 is elongated and vertical in orientation, the mirror frame 34 in FIGS. 8 and 9 is rectangular and horizontal in orientation. Yet, the same support and drive mechanisms are used for both mirrors. In other words, by simply replacing the existing mirror frame 34 with one of the desired size and shape, one can change the size and shape of the mirror 41 within the new mirror frame 34. As previously explained, this is accomplished by removing the existing mirror frame, and then installing and attaching the new mirror frame 34 to the swivel member 21 and to the movable portions of the actuators 49 and 56. If the optics of the mirror 41 need to be changed, from a distortion free view provided by a planar mirror to a wide angle view provided by a convex mirror, the existing mirror element 41 is simply removed from the mirror frame 34 and a new mirror element is slid into place. Such a convex mirror element installed in a rectangular and horizontally oriented mirror frame 34 is shown in FIGS. 10 and 11.

What is claimed is:

1. A remote control mirror assembly for a motor vehicle having a cab and a mirror support arm extending from at least one side of the motor vehicle, comprising:
   a. a main frame, said main frame having a front end;
   b. a connector supporting said main frame on the mirror support arm;
   c. a swivel member, said swivel member having an upper end, a lower end, and an intermediate portion therebetween, said intermediate portion being pivotally mounted about a horizontal axis to said front end of said main frame, said swivel member further having an upper pin extending from said upper end and a lower pin extending from said lower end;
   d. a mirror frame, said mirror frame having a front side and a rear side, and including a mirror affixed to said front side, said rear side having an upper bracket with an aperture to receive said upper pin of said swivel member, said rear side further having a lower bracket provided with a removable clamp with an aperture to receive said lower pin of said swivel member;
   e. a horizontal sweep ram actuator having a body portion pivotally connected to said main frame and having a movable portion extending past said front end of said main frame and being pivotally connected to a flange located on said rear side of said mirror frame;
   f. a vertical tilt ram actuator having a body portion pivotally connected to said main frame and having a movable portion extending past said front end of said main frame and being pivotally connected to a flange mounted on said swivel member, in a position vertically offset from said horizontal axis; and,
   g. means for selectively actuating said horizontal sweep ram actuator and said vertical tilt ram actuator, for controlling the horizontal and vertical orientation of said mirror.

2. A remote control mirror assembly as in claim 1, in which said frame includes a detachable housing, and in which said body portion of said horizontal sweep ram actuator and said body portion of said vertical tilt ram actuator are located within said housing.

3. A remote control mirror assembly as in claim 2, further including a rock shield above and attached to an upper wall of said housing, said rock shield including a plurality of inclined ribs spaced along said shield.

4. A remote control mirror assembly as in claim 1, in which said horizontal sweep ram actuator and said vertical tilt ram actuator are electrically powered, and include means to dampen vibrations transferred to their respective movable portions.

5. A remote control mirror assembly as in claim 1, in which said means for selectively actuating said horizontal sweep ram actuator and said vertical tilt ram actuator comprises a toggle switch box located remotely from said main frame.

6. A remote control mirror assembly as in claim 5, in which said ram actuators are electrically powered, and in which an electronic control module is mounted on said main frame, and in which said electronic control module has input circuits respectively interconnected to a horizontal control switch and a vertical control switch in said toggle switch box and output circuits respectively interconnected to said horizontal sweep ram actuator and said vertical tilt ram actuator.

7. A remote control mirror assembly as in claim 5, in which said ram actuators are electrically powered, and in which an electronic control module is mounted on said main frame, and in which said electronic control module includes an rf receiver and ram actuator drivers respectively interconnected to said horizontal sweep ram actuator and said vertical tilt ram actuator, and in which said toggle switch box includes an rf transmitter having input circuits connected to said horizontal control switch and said vertical control switch.

8. A remote control mirror assembly as in claim 1, in which said mirror is planar.

9. A remote control mirror assembly as in claim 1, in which said mirror is convex.

10. A remote control mirror assembly as in claim 1, in which said front side of said mirror frame includes grooves for slidably receiving a mirror.

11. A remote control mirror assembly as in claim 1, in which said pivot connection between said movable portion of said horizontal sweep ram actuator and said flange on said rear side of said mirror frame includes a heim joint.

12. A remote control mirror assembly as in claim 1, in which said intermediate portion of said swivel member includes a pair of pins extending from opposing sides thereof, and in which respective brackets having apertures therein to receive a respective said pin, said brackets being mounted on said front end of said main frame, are provided.

13. A remote control mirror assembly, comprising:
   a. a main frame, said main frame defining a housing with a top cover and sidewalls, said main frame further including a front end;
   b. means for connecting said main frame to a mirror support arm;
   c. a horizontal sweep ram actuator having a body portion pivotally connected to said main frame within said housing, and having a movable portion extending outwardly from said housing, past said front end of said main frame;
   d. a vertical tilt ram actuator having a body portion pivotally connected to said main frame within said housing, and having a movable portion extending outwardly from said housing, past said front end of said main frame;
   e. an elongated swivel member, said swivel member having an upper end, a lower end, and an intermediate portion therebetween, said intermediate portion being pivotally mounted about a horizontal axis to said front end of said main frame, said swivel member further having an upper pin extending from said upper end and a lower pin extending from said lower end;

f. a mirror frame, said mirror frame having a front side and a rear side, and including a mirror affixed to said front side, said rear side having an upper bracket with an aperture to receive said upper pin of said swivel member, said rear side further having a lower bracket provided with a removable clamp with an aperture to receive said lower pin of said swivel member, said movable portion of said horizontal sweep ram actuator being pivotally connected to a flange located on said rear side of said mirror frame, and said movable portion of said vertical tilt ram actuator being pivotally connected to a flange mounted on said swivel member, in a position vertically offset from said horizontal axis; and, g. means for selectively actuating said horizontal sweep ram actuator and said vertical tilt ram actuator, for controlling the horizontal and vertical orientation of said mirror.

14. A remote control mirror assembly as in claim 13, in which said means for selectively actuating said horizontal sweep ram actuator and said vertical tilt ram actuator comprises a toggle switch box located remotely from said main frame.

15. A remote control mirror assembly as in claim 14, in which said ram actuators are electrically powered, and in which an electronic control module is mounted on said main frame, and in which said electronic control module has input circuits respectively interconnected to a horizontal control switch and a vertical control switch in said toggle switch box and output circuits respectively interconnected to said horizontal sweep ram actuator and said vertical tilt ram actuator.

16. A remote control mirror assembly as in claim 14, in which said ram actuators are electrically powered, and in which an electronic control module is mounted on said main frame, and in which said electronic control module includes an rf receiver and ram actuator drivers respectively interconnected to said horizontal sweep ram actuator and said vertical tilt ram actuator, and in which said toggle switch box includes an rf transmitter having input circuits connected to said horizontal control switch and said vertical control switch.

17. A remote control mirror assembly for a motor vehicle having a cab and a mirror support arm extending from at least one side of the motor vehicle, comprising:

a. a main frame, said main frame having a front end;

b. a connector supporting said main frame on the mirror support arm;

c. a swivel member, said swivel member having an upper end, a lower end, and an intermediate portion therebetween, said intermediate portion being pivotally mounted about a horizontal axis to said front end of said main frame, said swivel member further having an upper pin extending from said upper end and a lower pin extending from said lower end;

d. a mirror frame, said mirror frame having a front side and a rear side, and including a mirror affixed to said front side, said rear side having an upper bracket with an aperture to receive said upper pin of said swivel member, said rear side further having a lower bracket provided with a removable clamp with an aperture to receive said lower pin of said swivel member;

e. an electrically powered horizontal sweep ram actuator having a body portion pivotally connected to said main frame and having a movable portion extending past said front end of said main frame and being pivotally connected to a flange located on said rear side of said mirror frame;

f. an electrically powered vertical tilt ram actuator having a body portion pivotally connected to said main frame and having a movable portion extending past said front end of said main frame and being pivotally connected to a flange mounted on said swivel member, in a position vertically offset from said horizontal axis; and, g. remote control means for selectively actuating said horizontal sweep ram actuator and said vertical tilt ram actuator from the cab of the motor vehicle, for controlling the horizontal and vertical orientation of said mirror, said remote control means comprising an electronic control module mounted on said main frame, in which said electronic control module has input circuits responsive to a horizontal control switch and a vertical control switch in a toggle switch box in the cab, and in which said electronic control module has output circuits respectively interconnected to said horizontal sweep ram actuator and said vertical tilt ram actuator.

18. A remote control mirror assembly as in claim 17, in which said front side of said mirror frame includes grooves for slidably receiving a mirror.

19. A remote control mirror assembly as in claim 17, in which said pivot connection between said movable portion of said horizontal sweep ram actuator and said flange on said rear side of said mirror frame includes a heim joint.

20. A remote control mirror assembly as in claim 17, in which said intermediate portion of said swivel member includes a pair of pins extending from opposing sides thereof, and in which respective brackets having apertures therein to receive a respective said pin, said brackets being mounted on said front end of said main frame, are provided.

* * * * *